(12) United States Patent
Casey et al.

(10) Patent No.: US 9,154,857 B2
(45) Date of Patent: *Oct. 6, 2015

(54) ABR LIVE TO VOD SYSTEM AND METHOD

(71) Applicant: CenturyLink Intellectual Property LLC, Denver, CO (US)

(72) Inventors: Steven Casey, Littleton, CO (US); Felipe Castro, Erie, CO (US); Kevin McBride, Lone Tree, CO (US); Ronnie Dhaliwal, Centennial, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/583,869

(22) Filed: Dec. 29, 2014

(65) Prior Publication Data
US 2015/0156565 A1    Jun. 4, 2015

Related U.S. Application Data

(63) Continuation of application No. 13/795,562, filed on Mar. 12, 2013, now Pat. No. 8,949,912.

(51) Int. Cl.
| | |
|---|---|
| H04N 7/173 | (2011.01) |
| H04N 21/8549 | (2011.01) |
| H04N 21/2225 | (2011.01) |
| H04N 21/2343 | (2011.01) |
| H04N 21/2747 | (2011.01) |
| H04N 21/845 | (2011.01) |
| H04N 21/266 | (2011.01) |

(52) U.S. Cl.
CPC ....... *H04N 21/8549* (2013.01); *H04N 21/2225* (2013.01); *H04N 21/23439* (2013.01); *H04N 21/266* (2013.01); *H04N 21/2747* (2013.01); *H04N 21/8456* (2013.01)

(58) Field of Classification Search
USPC ................................ 725/87, 93–95, 115–116
See application file for complete search history.

(56) References Cited

U.S. PATENT DOCUMENTS

| | | | |
|---|---|---|---|
| 8,463,849 B2 * | 6/2013 | Keum et al. ................... 709/203 |
| 8,949,912 B2 | 2/2015 | Casey et al. | |
| 2009/0178089 A1 * | 7/2009 | Picco et al. ..................... 725/87 |
| 2013/0159388 A1 * | 6/2013 | Forsman et al. .............. 709/203 |
| 2013/0311670 A1 * | 11/2013 | Tarbox et al. ................. 709/231 |

(Continued)

OTHER PUBLICATIONS

U.S. Appl. No. 13/795,562; Issue Notification dated Jan. 14, 2015; 1 page.

(Continued)

*Primary Examiner* — Mulugeta Mengesha
(74) *Attorney, Agent, or Firm* — Swanson & Bratschun, L.L.C.

(57) ABSTRACT

The disclosed embodiments include a method, apparatus, and computer program product for simplifying the process of creating a video-on-demand system. For example, in one embodiment, a method for creating a video-on-demand (VOD) system is disclosed that includes dynamically capturing segments of an adaptive bit rate (ABR) live stream of the program at time of broadcasting and storing the captured segments of the ABR live stream of the program as a VOD file. The method also includes creating a manifest file comprising information for playing back the VOD file. The method further includes playing back, using the manifest, the VOD file by transmitting the captured ABR segments to a client device in response to receiving a subscriber request for the program.

20 Claims, 4 Drawing Sheets

(56) References Cited

U.S. PATENT DOCUMENTS

2013/0329777 A1* 12/2013 Konda et al. ............. 375/240.01
2014/0025710 A1* 1/2014 Sarto ............................. 707/823
2014/0040496 A1* 2/2014 Moorthy et al. ............. 709/231

OTHER PUBLICATIONS

U.S. Appl. No. 13/795,562; Non-Final Rejection dated May 23, 2014; 26 pages.
U.S. Appl. No. 13/795,562; Notice of Allowance dated Sep. 30, 2014; 13 pages.

* cited by examiner

ABR LIVE TO VOD SYSTEM AND METHOD

CROSS REFERENCES TO RELATED APPLICATIONS

This application is a continuation application of U.S. patent application Ser. No. 13/795,562, filed by Steven Casey et al. by and titled, "ABR Live to VOD System and Method", which is hereby incorporated by reference in its entirety.

BACKGROUND OF THE INVENTION

1. Field of the Invention

The present invention relates generally to methods and systems for creating a video-on-demand (VOD) system.

2. Discussion of the Related Art

Video-on-demand (VOD) is a system that allows users to select and watch/listen to video or audio content on demand. IPTV technology is often used to bring video-on-demand to televisions and personal computers.

Television video-on-demand systems either stream content through a set-top box, a computer or other device, allowing viewing in real time, or download it to a device such as a computer, digital video recorder (also called a personal video recorder) or portable media player for viewing at any time. The majority of cable and telco-based television providers offer both video-on-demand streaming, including pay-per-view and free content, whereby a user buys or selects a movie or television program and it begins to play on the television set almost instantaneously.

BRIEF SUMMARY OF THE INVENTION

The disclosed embodiments include a method, apparatus, and computer program product for creating a video-on-demand (VOD) system. For example, in one embodiment, a method for creating a video-on-demand system is disclosed that includes dynamically capturing segments of an adaptive bit rate (ABR) live stream of the program at the time of broadcasting and storing the captured segments of the ABR live stream of the program as a VOD file. The method also includes creating a manifest file comprising information for playing back the VOD file. The method further includes playing back, using the manifest, the VOD file by transmitting the captured ABR segments to a client device in response to receiving a subscriber request for the program.

Advantages of the disclosed embodiments include, but are not limited to, reducing the complexities of a video-on-demand system by the capturing of live ABR segments, storing of the ABR segments, and playing back the ABR segments in its original format as a video-on-demand file. For instance, the disclosed embodiments reduces the processing requirements, time, and complexities associated with having to encode and decode media content files into different media content data formats for generating a video-on-demand system. Additionally, by capturing the live ABR streams, the disclosed embodiments for generating a video-on-demand system does not require that media content providers perform any additional processing or rerouting of media content beyond the norm.

Additional embodiments, advantages, and novel features are set forth in the detailed description.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments include a system and method for configuring a video-on-demand system to capture live adaptive bit rate (ABR) streams for generating video-on-demand content.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
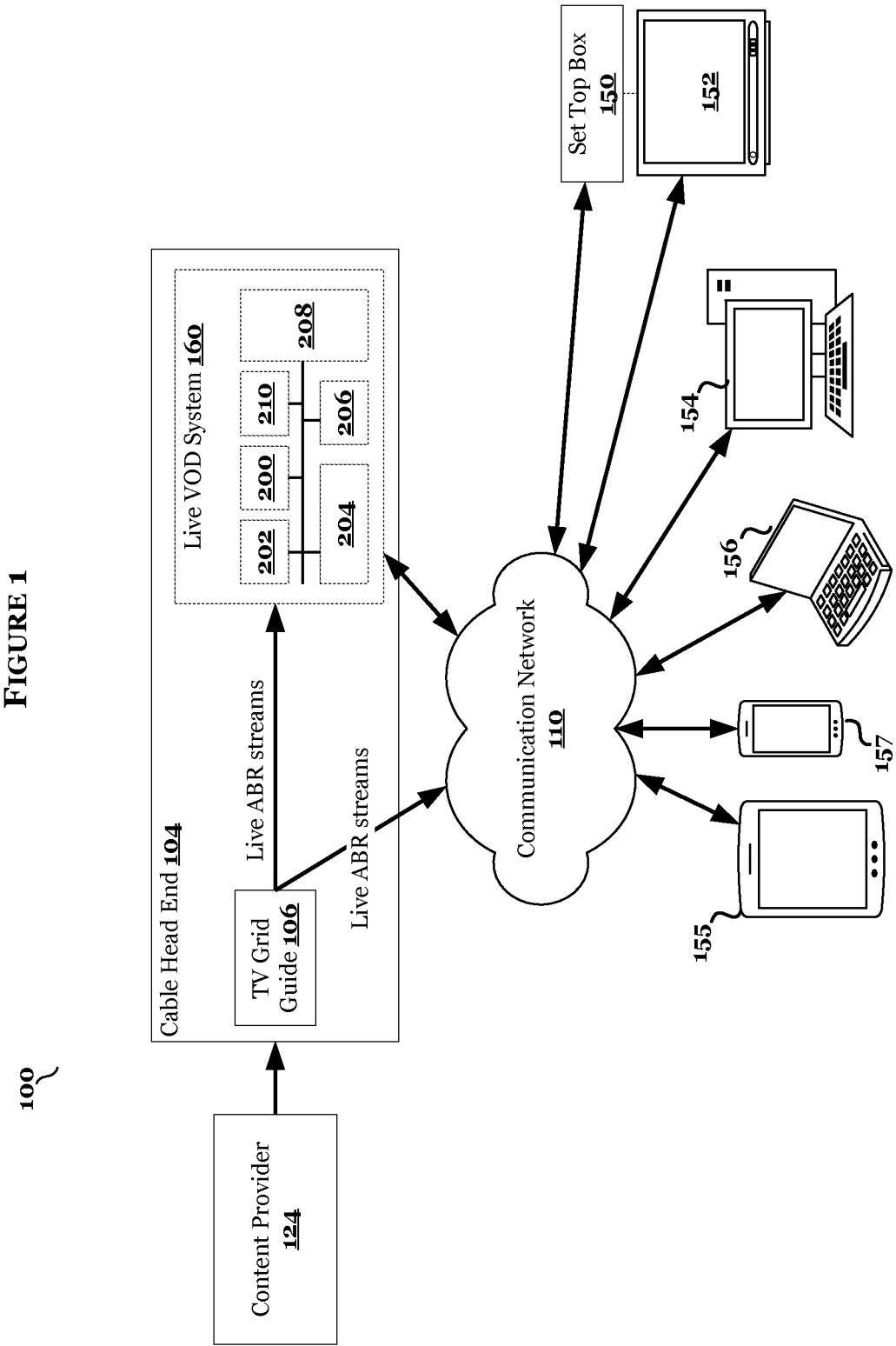
FIG. 1 illustrates a network environment in accordance with a disclosed embodiment.

FIG. 1 illustrates a network environment 100 in accordance with a disclosed embodiment. In the depicted embodiment, a cable head end 104 receives and processes media content from content providers 124 and provides the media content to a plurality of consumer devices over a communication network 110. The cable head end 104 may include several television receive-only satellite television dishes and other antennas for the reception of cable/satellite TV networks and local over-the-air television stations for distribution. The cable head end 104 may also include dedicated coaxial, microwave link or fiber-optic line, installed between a local station and the cable head end 104.

In the depicted embodiment, the cable head end 104 includes a system referred to herein as TV grid guide 106 that processes and manages the media content. One of the functions of the TV grid guide 106 is to maintain a schedule of TV programming times and channels associated media content received from each of the content providers 124. In one embodiment, the TV grid guide 106 is configured to receive the media content from the content providers 124 in a fragmented-type encoding format such as, but not limited to, an adaptive bit rate (ABR) format. A fragmented-type encoding format is a format in which a media content (e.g., a movie) is sliced into tiny successive fragments, each fragment containing a predetermined time segment of the media content (e.g., typically anywhere from 1 to 10 second fragments). An adaptive bit rate format is a type of fragmented encoding format in which the successive fragments/slices of the media content vary in size depending upon the encoding bit rate. For example, a single media content file may be encoded into several different bit rate streams, wherein the higher the bit rate, the more bandwidth is needed to transmit the bit rate stream at consistent pace. As will be further described, the disclosed embodiments include dynamically altering the bit rate stream of a video-on-demand media content file in an attempt to provide the best possible picture quality based on the available bandwidth.

In one embodiment, the TV grid guide 106 utilizes an encoder to encode the media content received from the content providers 124 at multiple bit rates (i.e., the number of bits that are conveyed or processed per unit of time). The higher the bit rate results in the higher the quality of the media content. However, as stated above, high bit rates require high available bandwidth for transferring the high bit rates. If a high bit rate is transferred over low available bandwidth then the result is that a user must wait until enough of the media content is received to begin playing or to continue playing the media content. Thus, by encoding the media content at multiple bit rates, the streaming of the segments of the media content may be adapted to the real-time available bandwidth of a user. In other words, during the streaming media content, the bit rate stream may be throttled between low and high bit rates as needed to achieve the best quality picture without delay based on the available real-time bandwidth.

In an alternative embodiment, the TV grid guide 106 may be configured to receive the media content from the content providers 124 at multiple bit rate streams, thereby not requiring the use of an encoder at the TV grid guide 106. In other words, the media content providers 124 perform the ABR encoding at various bit rates and transmits some or all of the bit rate streams to the TV grid guide 106.

As depicted in FIG. 1, the TV grid guide 106 includes a communication interface for transmitting the media content (e.g., live ABR streams) over a communication network 110 to a plurality of different end-user devices, such as, but not limited to, a set top box 150, a television 152, a desktop computer 154, a laptop computer 156, a smart phone 157, a tablet 155, and any other video displayable device (e.g., a gaming console (not depicted)). The communication network 110 may include one or more cable/satellite networks, telephone networks, cellular/data networks, and other private and public networks including the Internet.

In addition to communicating the media content to consumer devices, in accordance with the disclosed embodiments, the cable head end 104 includes a live video-on-demand (VOD) system 160 that captures the live ABR streams as they are being transmitted. In one embodiment, the TV grid guide 106 may be configured to reroute a duplicate set of the live ABR streams to the live video-on-demand system 106. Alternatively, the live video-on-demand system 106 may be serially connected between the TV grid guide 106 and the communication network 110 for capturing the desired live ABR streams.

An example of the basic system architecture of the live video-on-demand system 106 is illustrated in FIG. 1. The live video-on-demand system 106 generally includes one or more processors 200 that are configured to execute instructions. The live video-on-demand system 106 may also include main memory 202 for temporarily storing data and instructions to be processed, and a secondary storage component 204 for long term storage of executable instructions and other data such as, but not limited to, video-on-demand media content files. In some embodiments, the live video-on-demand system 106 may also include a display module 210 and an input/output interface 206 for connecting the live video-on-demand system 106 to a display and/or other input/output devices. The live video-on-demand system 106 also includes a communication interface 208 for communicatively coupling the live video-on-demand system 106 to the communication network 110 for enabling network communications.

Figure 2:
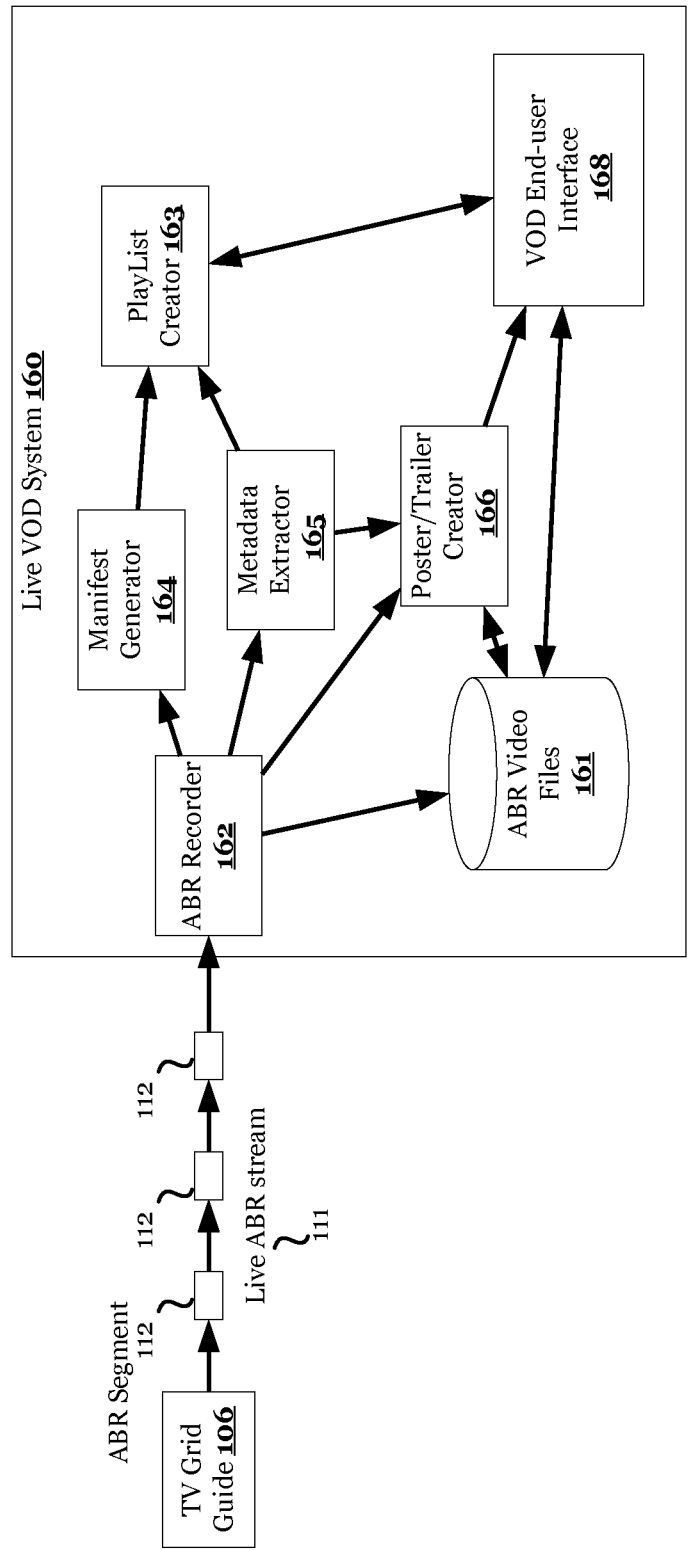
FIG. 2 illustrates a live adaptive bit rate to video-on-demand system in accordance with a disclosed embodiment.

FIG. 2 depicts an embodiment of the live video-on-demand system 106 in accordance with the disclosed embodiments. As depicted in FIG. 2, the live video-on-demand system 106 captures a live ABR stream 111 from the TV grid guide 106 using an ABR recorder 162. The live ABR stream 111 consists of ABR segments 112 that make up a media content. Although only one live ABR stream is depicted, the disclosed embodiments may be configured to simultaneously capture any number of ABR streams on a single channel or on any number of channels. For instance, the live video-on-demand system 106 may be configured to capture every or some ABR streams of varying bit rates for a particular media content. Alternatively, the live video-on-demand system 106 may be configured to capture just a single ABR stream at a particular bit rate for a particular media content. Additionally, the live video-on-demand system 106 may include any number of ABR recorders 162. In one embodiment, the ABR recorders 162 are not hardwired to any particular channel, but instead may be dynamically adjusted to capture ABR streams from any channel.

The live video-on-demand system 106 stores the captured ABR segments 112 in one or more ABR video files database 161. The live video-on-demand system 106 includes a metadata extractor 165 that is configured to extract metadata information (e.g., source information, offsets, durations, transcoding information, etc.) from the captured ABR segments 112.

In addition, the live video-on-demand system 106 includes a manifest generator 164 that is configured to generate a manifest file for each of the stored media contents based on the captured ABR segments 112. The manifest file includes information describing the fragment metadata, data regarding a set of multiple "layers," each made up of the media data for a different target bitrate, sequencing information from a first ABR segment to a last/final ABR segment corresponding to a media content, and other information for enabling the live video-on-demand system 106 and/or a client device (e.g., the set top box 150, the smart phone 157, and the laptop 156) to retrieve and playback the ABR segments of a requested media content file.

Using the manifest and metadata information, the live video-on-demand system 106 includes a playlist creator 163 that adds the media content to a video-on-demand electronic program guide (i.e., a list of shows/video-on-demand schedule). The playlist creator 163 may also include other information in the playlist such as, but not limited to, a cost associated with a video-on-demand media content, a rating, channel availability, bit rates available, reviews of the media content, and any other information associated with a video-on-demand media content.

Additionally, in certain embodiments, the live video-on-demand system 106 may also include a poster and/or trailer creator module 166 that is configured to either extract a poster and/or trailer associated with a video-on-demand media content and/or generate a poster and/or trailer segment from the captured ABR segments corresponding to the video-on-demand media segment. For example, in one embodiment, a poster image for a video-on-demand media content may be generated by extracting the poster image from a frame from one of the ABR segments of the video-on-demand media content file.

The live video-on-demand system 106 may include a video-on-demand end user interface 168 that is configured to generate a user interface to be displayed on a client device for enabling a user to access the media content stored on the live video-on-demand system 106. The video-on-demand end user interface 168 may communicate with each other the above described modules of the live video-on-demand system 106 for retrieving and playing back a requested video-on-demand media content file. In certain embodiments, the video-on-demand end user interface 168 may also be configured to handle subscriber billing for a requested video-ondemand media content file. Alternatively, the live video-on-demand system 106 may be configured to communicate with a separate subscriber database and/or subscriber billing database for billing a user for a requested video-on-demand media content file.

The video-on-demand end user interface 168 may also be configured to enable a service provider personnel to configure the live video-on-demand system 106. For example, the service provider personnel may select which live media content are to be captured by the live video-on-demand system 106, the various bit rate streams that are to be captured, and whether it's a one-time occurrence or a repeating/series occurrence.

Figure 3:
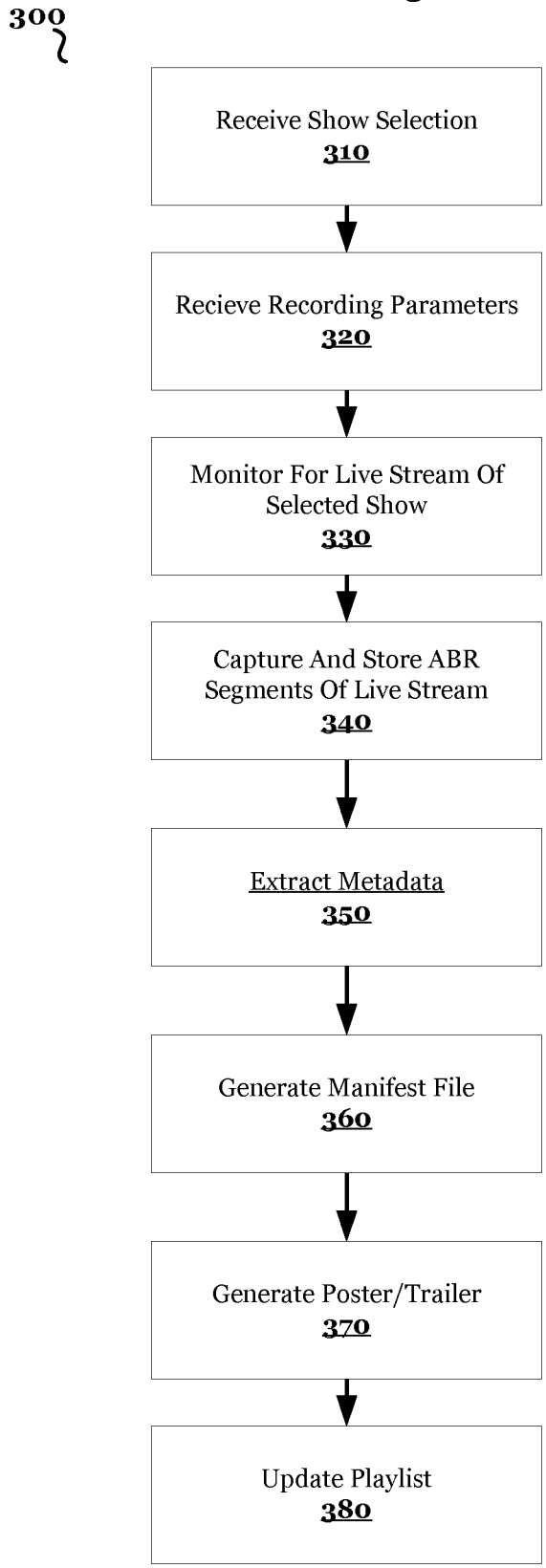
FIG. 3 illustrates a block diagram depicting a process for creating video-on-demand content in accordance with a disclosed embodiment.

FIG. 3 illustrates a block diagram depicting a process 300 performed by the live video-on-demand system 106 for creating video-on-demand content in accordance with a disclosed embodiment. The process begins at step 310, by receiving a show selection that indicates a live media content stream that is to be captured and stored by the live video-on-demand system 106. In addition, the process at step 320 may receive recording parameters associated with the selected media content such as, but not limited to, selecting the bit rate streams that are to be captured for a particular media content. For example, a service provider may choose to capture all available bit rate streams or only certain bit rate streams. This parameter may be set for each individual media content file and/or may be the default parameter settings for all captured media content files.

At step 330, the process monitors for the selected live ABR streams corresponding to the selected media content. At step 340, the process captures and stores the live ABR segments and extracts metadata associated with the captured ABR segments at step 350. Using the captured ABR segments and the extracted metadata, the process of the 360 generate a manifest file for the recorded media content file. In certain embodiments, the process at step 370 may generate a poster image and/or a trailer corresponding to the recording media content file. At step 380, the process updates the video-on-demand playlist with the newly captured video-on-demand media content file, with process 300 terminating thereafter.

Figure 4:
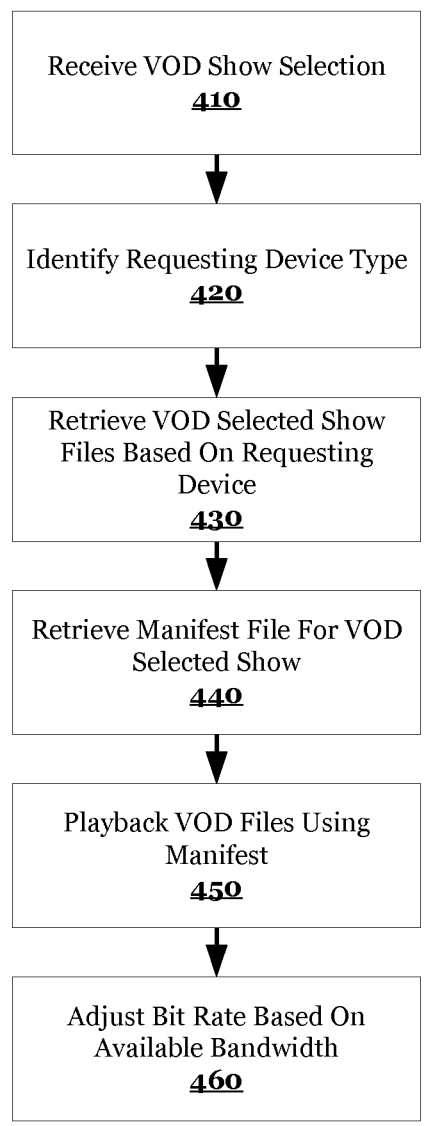
FIG. 4 illustrates a block diagram depicting a process for playing back video-on-demand content in accordance with a disclosed embodiment.

FIG. 4 illustrates a block diagram depicting a process 400 performed by the live video-on-demand system 106 for playing back video-on-demand content in accordance with a disclosed embodiment. The process begins at step 410 by receiving a video-on-demand media content selection request from a client device. The process at step 420 identifies the type of client device and available bandwidth corresponding with the client device that is requesting the video-on-demand media content file. At step 430, the process retrieves a particular ABR bit rate stream based on the determined client device type and available bandwidth. For example, if the requesting device is a set top box over a wired Ethernet cable connection, the process would select a high-quality large image corresponding to a high ABR bit rate stream. If the requesting device is a smart phone communicating over a slower cellular data network, the process would select a smaller low resolution picture image corresponding to a low ABR bit rate stream.

At step 430, the process retrieves and transmits the manifest file for the requested video-on-demand media content file. The process transmits the ABR segments based on manifest file for playing back the requested video-on-demand media content file on the client device. Additionally, the process may encrypt and/or include some form of digital rights management encoding with the transmitted ABR segments. If the available bandwidth associated with the requesting client device changes during playback of the video-on-demand media content, the process at step 460 may adjust the selection of the ABR bit stream rates to provide a consistent acceptable image/sound quality, with the process 400 terminating after the playback of the requested media content file is completed or terminated by the client device.

Accordingly, as described above, advantages of the disclosed embodiments include, but are not limited to, providing a system and method for creating a video-on-demand (VOD) system. Advantages of the disclosed embodiments include, but are not limited to, reducing the complexity of a video-on-demand system by capturing of live ABR segments, storing of the ABR segments, and playing back the ABR segments as a video-on-demand file. For instance, the disclosed embodiments reduces the processing requirements, time, and complexities associated with having to encode and decode media content files into different media content data formats for generating a video-on-demand system. Additionally, by rerouting and capturing the live ABR streams from the TV grid guide 106, the disclosed embodiments for generating a video-on-demand system does not require that media content providers perform any additional processing or routing beyond the norm.

While specific details about the above embodiments have been described, the above hardware and software descriptions are intended merely as example embodiments and are not intended to limit the structure or implementation of the disclosed embodiments.

In addition, as outlined above, certain aspects of the disclosed embodiments may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

In addition, the flowcharts, sequence diagrams, and block diagrams in the Figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

We claim:

1. A method for creating a video-on-demand (VOD) system, the method comprising:
   receiving a request to record a program for including the program in the VOD system;
   determining when the program is to be broadcast;
   dynamically capturing segments of fragmented-type encoding live stream of the program at a time of broadcasting;
   storing the captured segments of the fragmented-type encoding live stream of the program;
   creating a manifest file comprising information for playing back the captured segments; and
   playing back, using the manifest file, the captured fragmented-type encoding segments to a client device in response to receiving a request to view the program.

2. The method of claim 1, further comprising simultaneously capturing multiple live streams of a plurality of programs.

3. The method of claim 1, wherein the captured segments include at least two bit rates for each time segment of the program.

4. The method of claim 3, further comprising:
   identifying a type of client device; and
   dynamically selecting a particular bit rate of the program for playback based on the type of client device.

5. The method of claim 1, further comprising creating a poster image for the program from data provided by a content provider.

6. The method of claim 1, further comprising creating a poster image for the program by extracting the poster image from a frame of one of the captured segments.

7. The method of claim 1, further comprising creating a trailer for the program from at least one of the captured segments.

8. The method of claim 1, wherein the manifest file includes data regarding at least one layer, each layer comprising the captured segments in a respective bit rate different for each layer.

9. The method of claim 1, wherein the fragmented-type encoding includes adaptive bit rate encoding.

10. A system for converting a live fragmented-type encoding stream, the system comprising:
    a cable head end configured to receive and broadcast media content from a content provider, the cable head end comprising:
       a television grid guide configured to encode the media content with a fragmented-type encoding for broadcasting in at least one bitrate;
       a video-on-demand (VOD) device in communication with the television grid guide, the VOD device comprising:
          at least one processor
          a data storage unit for storing captured media;
          non-transitory computer readable media having encoded thereon computer software comprising a set of instructions executable by the at least one processor to perform one or more operations, the set of instructions comprising:
             instructions to receive, via a client interface, a request to record a program for including the program in the VOD system;
             instructions to determine when the program is to be broadcast;
             instructions to capture, from the television grid guide, segments of a fragmented-type encoding live stream of the program at a time of broadcasting;
             instructions to store, via the data storage unit, the captured segments of the fragmented-type encoding live stream of the program;
             instructions to create a manifest file comprising information for playing back the captured segments; and
             instructions to play back the captured segments using the manifest file in response to receiving a request to view the program.

11. The system of claim 10, wherein the television grid guide encodes the media content in at least two bit rates, and wherein the captured segments include the at least two bit rates of each time segment of the program.

12. The system of claim 11, wherein the set of instructions further comprise:
    instructions to identify a type of a client device in communication with the VOD device; and
    instructions to dynamically select a particular bitrate of the program for playback based on the type of the client device.

13. The system of claim 10, wherein the fragmented-type encoding includes adaptive bit rate encoding.

14. The system of claim 10, wherein the manifest file includes data regarding at least one layer, each layer comprising the captured segments in a respective bit rate different for each layer.

15. A video-on-demand (VOD) device comprising:
    at least one processor
    a data storage unit for storing captured media;
    non-transitory computer readable media having encoded thereon computer software comprising a set of instructions executable by the at least one processor to perform one or more operations, the set of instructions comprising:
       instructions to receive, via a client interface, a request to record a program for including the program in the VOD system;

instructions to determine when the program is to be broadcast;

instructions to capture segments of a fragmented-type encoding live stream of the program at a time of broadcasting;

instructions to store, via the data storage unit, the captured segments of the fragmented-type encoding live stream of the program;

instructions to create a manifest file comprising information for playing back the captured segments; and instructions to play back the captured segments using the manifest file in response to receiving a request to view the program.

16. The device of claim 15, wherein the set of instructions further comprise instructions to simultaneously capture segments of multiple fragmented-type encoding live streams of a plurality of programs.

17. The device of claim 15, wherein the captured segments include at least two bit rates of each time segment of the program.

18. The device of claim 17, wherein the set of instructions further comprise:
  instructions to identify a type of the client device; and
  instructions to dynamically select a particular bitrate of the program for playback based on the type of client device.

19. The device of claim 15, wherein the fragmented-type encoding includes adaptive bit rate encoding.

20. The device of claim 15, wherein the manifest file includes data regarding at least one layer, each layer comprising the captured segments in a respective bit rate different for each layer.

* * * * *